US010393292B2

(12) United States Patent
Ollier et al.

(10) Patent No.: US 10,393,292 B2
(45) Date of Patent: Aug. 27, 2019

(54) METHOD OF MANUFACTURING A PIPE SEGMENT

(71) Applicant: ITP SA, Louveciennes (FR)

(72) Inventors: Pierre Ollier, Boulogne Billancourt (FR); Jean-Aurélien Damour, Louveciennes (FR)

(73) Assignee: ITP SA, Louveciennes (FR)

( * ) Notice: Subject to any disclaimer, the term of this patent is extended or adjusted under 35 U.S.C. 154(b) by 261 days.

(21) Appl. No.: 15/259,331

(22) Filed: Sep. 8, 2016

(65) Prior Publication Data

US 2017/0067582 A1 Mar. 9, 2017

(30) Foreign Application Priority Data

Sep. 8, 2015 (FR) ..................................... 15 01854

(51) Int. Cl.

| | |
|---|---|
| ***B21D 53/08*** | (2006.01) |
| ***B23P 15/26*** | (2006.01) |
| ***F16L 13/02*** | (2006.01) |
| ***E21B 17/01*** | (2006.01) |
| ***E21B 17/042*** | (2006.01) |
| ***F16L 39/00*** | (2006.01) |
| ***F16L 59/02*** | (2006.01) |
| ***F16L 59/14*** | (2006.01) |
| ***F16L 59/20*** | (2006.01) |

(52) U.S. Cl.

CPC ........ *F16L 13/0209* (2013.01); *E21B 17/017* (2013.01); *E21B 17/042* (2013.01); *F16L 39/005* (2013.01); *F16L 59/028* (2013.01); *F16L 59/143* (2013.01); *F16L 59/20* (2013.01)

(58) Field of Classification Search

CPC ........ B21D 39/06; B21D 53/08; B21D 53/02; B21C 37/22; B23P 15/26

See application file for complete search history.

(56) References Cited

U.S. PATENT DOCUMENTS 3,313,902 A * 4/1967 Akin .................... G01F 23/242 200/190
3,471,177 A * 10/1969 Garrett .................... E21B 17/04 138/114

(Continued)

*Primary Examiner* — David P Bryant
*Assistant Examiner* — Lawrence Averick
(74) *Attorney, Agent, or Firm* — Oliff PLC

(57) ABSTRACT

The invention relates to a method of manufacturing a pipe segment for a link tube between the sea floor and a petroleum drilling rig disposed on the sea surface, wherein it consists in:

- providing a transport pipe segment that is resistant to open-sea conditions;
- disposing a female bayonet-piece around one reinforced end of the transport pipe segment;
- welding or otherwise bonding a narrower portion of the bayonet-piece to said reinforced end;
- disposing an insulator around the transport pipe segment and around the bayonet-piece;
- inserting the transport pipe segment into an outer wall segment;
- welding or otherwise bonding a narrower portion of the outer wall segment to the other reinforced end of the transport pipe segment;
- disposing a cover-piece around the bayonet-piece;
- welding or otherwise bonding the cover-piece to the outer wall segment and to the bayonet-piece;
- it being possible to apply tightening torque to the outer wall segment and to transmit it to the transport pipe segment.

12 Claims, 6 Drawing Sheets

(56) References Cited

U.S. PATENT DOCUMENTS

| | | | | | |
|---|---|---|---|---|---|
| 3,693,665 | A * | 9/1972 | Veerling | F16L 59/123 | 138/114 |
| 3,728,514 | A * | 4/1973 | Bernard | B23K 9/295 | 219/136 |
| 4,098,451 | A * | 7/1978 | Smith | B23K 9/0061 | 228/119 |
| 4,538,834 | A * | 9/1985 | Brady | F16L 59/166 | 285/10 |
| 4,579,373 | A * | 4/1986 | Neal | B60P 1/56 | 138/149 |
| 5,001,320 | A * | 3/1991 | Conley | B23K 9/0358 | 219/60 R |
| 5,862,866 | A * | 1/1999 | Springer | E21B 17/00 | 166/380 |
| 6,000,438 | A * | 12/1999 | Ohrn | E21B 17/01 | 138/149 |
| 6,221,505 | B1 * | 4/2001 | Shirai | B23K 26/28 | 428/594 |
| 6,322,494 | B1 * | 11/2001 | Bullivant | A61B 18/1485 | 600/104 |
| 7,722,088 | B2 * | 5/2010 | Pionetti | F16L 9/18 | 285/123.3 |
| 9,829,138 | B2 * | 11/2017 | Marchal | F16L 9/18 | |
| 2010/0038898 | A1 * | 2/2010 | Ollier | E21B 36/003 | 285/47 |
| 2010/0122810 | A1 * | 5/2010 | Langlais | E21B 43/088 | 166/230 |
| 2015/0038898 | A1 * | 2/2015 | Palmer | A61J 7/0053 | 604/60 |
| 2015/0338010 | A1 * | 11/2015 | Marchal | F16L 9/18 | 138/33 |

* cited by examiner

Fig.1
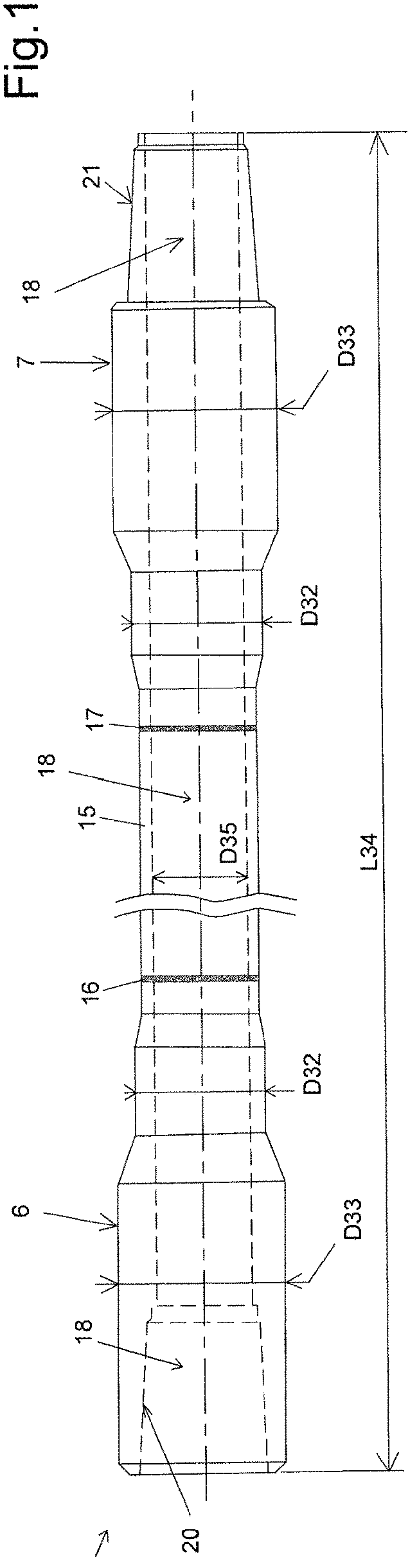
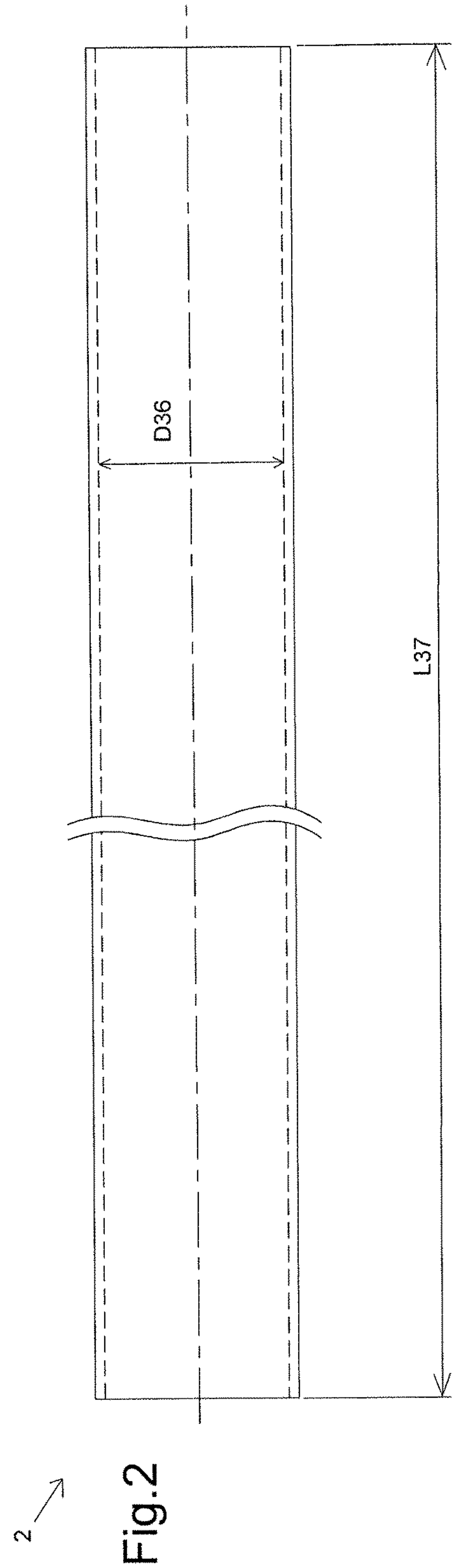
Fig.2

Fig.12
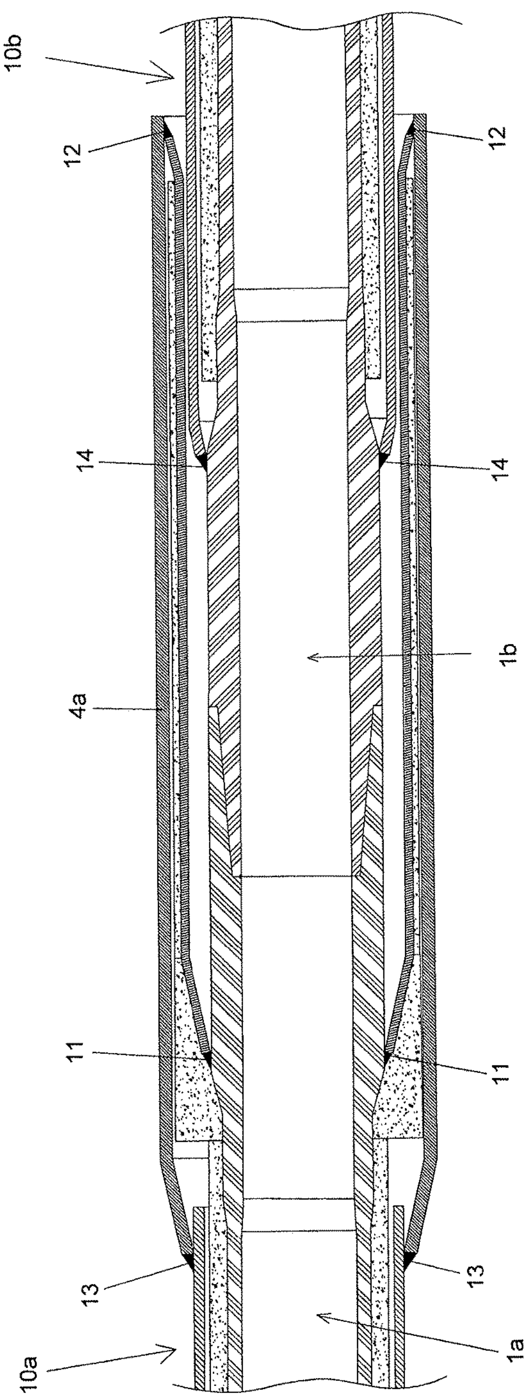
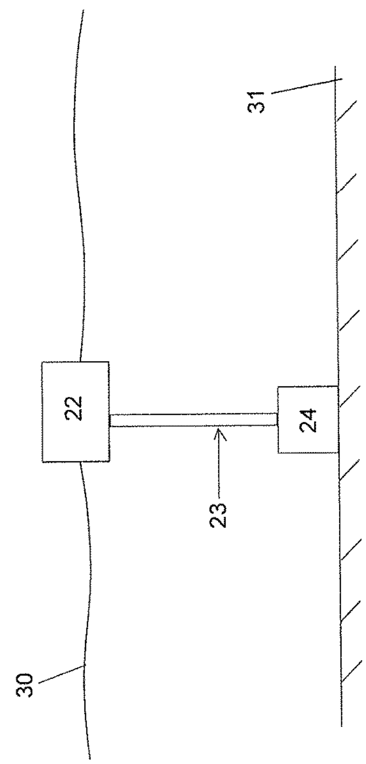
Fig.13

METHOD OF MANUFACTURING A PIPE SEGMENT

BACKGROUND OF THE INVENTION

1. Field of the Invention

The present invention relates to the technical field of link tubes between the sea floor and a petroleum rig disposed on the sea surface, such floor-to-surface link tubes being used to transport hydrocarbons from the sea floor to the sea surface.

2. Description of the Related Art

Floor-to-surface link tubes can be installed from a petroleum rig out at sea, and can reach a height of 1,000 meters (m) or indeed of 3,000 m. Such floor-to-surface link tubes must thus have particularly high traction strengths in order to withstand not only their own weights but also the torsion and transverse forces exerted by marine currents. In addition, a floor-to-surface link tube installed at a great depth must also withstand the surrounding water pressure.

A first technique consists in installing a transport pipe in a protective riser, also known as a "marine drilling riser". The space between the riser and the transport pipe can be filled with a thermally insulating gel, or with a heated fluid circulating by being pumped, or it can contain electric trace heating. Thus, the protective marine riser provides thermal protection in order to prevent solidified-hydrate blockages from forming in the transport pipe. In addition, the protective marine riser provides mechanical protection for the transport pipe. The main stress exerted on the transport pipe is stress in traction.

A drawback suffered by the technique of implementing floor-to-surface link tubes by using a protective marine riser is that it is a particularly lengthy technique. Thus, this first technique cannot be used effectively in emergency situations such as, for example, collecting hydrocarbon leaks coming from a subsea well or from equipment installed at great depths.

A second technique consists in using connection and transport pipe segments that withstand open-sea conditions. Each such pipe segment has of its ends threaded and of wider diameter so as to form a junction by quickly screwing together pipe segments placed end-to-end to form a transport pipe installed directly out in the open sea. The reinforced and threaded male or female ends are also referred to as "tool joints". The mechanical characteristics of such pipe segments enable the pipe installed directly out in the open sea to withstand not only traction forces but also the torsion and transverse forces exerted by the marine currents. Regarding its thermally protection, the transport pipe installed directly out in the open sea is equipped with a thermally insulating material held around the pipe by a sheath made of a plastics material.

However, a drawback is that such second assembly technique does not make it possible to provide thermal insulation that is effective. Thus, irreversible stoppages can occur due to formation of blockages of paraffin or of methane hydrate. The lower the temperature of the subsea hydrocarbon well and the deeper the floor-to-surface link tubes goes, the more frequent that type of failure is, since the floor-to-surface link tube then suffers major heat losses.

SUMMARY OF THE INVENTION

An object of the present invention is to avoid the drawbacks of the prior art by providing a floor-to-surface link tube that is simpler to install and that has thermal insulation making it possible to access great depths or low-temperature hydrocarbon deposits.

This object is achieved by means of a method of manufacturing a double-walled pipe segment for a link tube between the sea floor and a petroleum drilling rig disposed on the sea surface, said method being characterized in that it consists in:

- providing a connection and transport pipe segment that is resistant to open-sea conditions and that is provided with first and second threaded reinforced ends;
- disposing a female bayonet-piece around said first reinforced end, the female bayonet-piece including a wider portion that is extended by a cylindrical portion that is extended by a narrower portion that comes against a tightening portion of said first reinforced end;
- welding or otherwise bonding the narrower portion of the female bayonet-piece to said tightening portion of said first reinforced end;
- disposing a thermal insulator around the connection and transport segment pipe and around the female bayonet-piece;
- inserting the connection and transport pipe segment equipped with the thermal insulator into an outer wall segment;
- welding or otherwise bonding a narrower portion of the outer wall segment to said second reinforced end;
- disposing a metal cover-piece around the female bayonet-piece, the cover-piece having a cylindrical portion in contact at one end with the wider portion of the female bayonet-piece, and being extended at the other end via a narrower portion coming against the outer wall segment; and
- welding or otherwise bonding the narrower portion of the cover-piece to the outer wall segment and welding or otherwise bonding its cylindrical portion to the female bayonet-piece;
- a determined tightening torque may be applied around the outer wall segment.

In accordance with a feature of the invention, the welds or bonds are formed in such a manner as to enable said determined tightening torque to be transmitted to said reinforced ends so as to form a junction by screw-fastening between two connection and transport pipe segments of two adjacent double-walled pipe segments.

In accordance with another feature of the invention, the reinforced ends of the connection and transport pipe segment are made of a first steel having very high yield strength of at least 100 kilopounds per square inch (ksi) and preferably at least 120 ksi, the cover-piece and the female bayonet-piece being made of a same second steel having high yield strength of at least 65 ksi and preferably at least 80 ksi.

In accordance with a feature of the invention, the cover-piece and the female bayonet-piece are welded together by a lap weld, while, for the weld or bond between the female bayonet-piece and the tightening portion of said first reinforced end, the method consists in:

- preheating said first reinforced end and the narrower portion of said female bayonet-piece in contact with said first reinforced end, to a first temperature lying in the range 200° C. to 300° C.;
- performing a first welding pass between the narrower portion of the female bayonet-piece and said first reinforced end;
- performing filling by welding between the edge face of the narrower portion of the female bayonet-piece and the outside surface of said first reinforced end; and heat-treating the junction between the narrower portion of the female bayonet-piece and said first reinforced end, at a second temperature lying in the range 500° C. to 700° C.

In accordance with a feature of the invention, the outer wall segment is made of said second steel.

In accordance with a feature of the invention, the cover-piece and the outer wall segment are welded together by a lap weld, while, for the weld or bond between the outer wall segment and the tightening portion of said second reinforced end, the method consists in:

preheating the second reinforced end and a narrower portion of the outer wall segment in contact with said second reinforced end, to a first temperature lying in the range 200° C. to 300° C.;

performing a first welding pass between the narrower portion of the outer wall segment and said second reinforced end;

performing filling by welding between the edge face of the narrower portion of the outer wall segment and the outside surface of said second reinforced end; and heat-treating the junction between the narrower portion of the outer wall segment and said second reinforced end, at a second temperature lying in the range 500° C. to 700° C.

In accordance with a feature of the invention, the thermally insulating material is a solid material of the microporous type, the manufacturing method further comprising a step of putting the space disposed between the outer wall segment and the connection and transport pipe segment at a reduced pressure.

In accordance with a feature of the invention, the open-pore material is based on fumed silica.

In accordance with a feature of the invention, the female bayonet-piece has a maximum diameter lying in the range between 130% to 170% of the tightening portion of said first reinforced end.

In accordance with a feature of the invention, the wider portion of the female-piece is obtained by flaring it out against the cover-piece from a straight end portion of the female bayonet-piece.

In accordance with a feature of the invention, the inside diameter of the cylindrical portion of the female bayonet-piece is greater than the outside diameter of the outer wall segment, the female bayonet-piece coming in front of said first reinforced end and in such a manner as to overlap the outer wall segment of an adjacent double-walled pipe segment.

In a feature of the invention, said first and second reinforced ends correspond respectively to the female and male reinforced ends of the connection and transport pipe segment.

A first advantage is that the thermal insulation of the floor-to-surface link tube is improved. Thus, the thermal insulation along the transport tube is improved and the insulation at the junctions between pipe segments is also improved. Also advantageously, the passive thermal protection can be used without any external installation for supplying heating energy.

Another advantage of the present invention lies in the fact that two adjacent double-walled pipe segments can be screwed together and installed directly out in the open sea without requiring outer protection of the riser pipe type.

Another advantage is that the methods of assembling double-walled pipe segments are similar to the methods of assembling single-walled pipe segments equipped with reinforced ends of the "tool joint" type. The wider diameters of the double-walled pipe segments require only very slight modifications to the drilling rig.

Another advantage of the manufacturing method is that the pipe segments manufactured in accordance with the invention have longer lives while they are being stored, even in tropical environments. Their mechanical characteristics and their thermal insulation characteristics are preserved.

An advantage is also that the double-walled pipe segments manufactured in accordance with the invention also have longer lives after they are installed on site. The pipe segments and the tube assembled or made up from the segments withstand, in particular, impacts that might occur against the drilling rig on the surface.

Another advantage is that the female bayonet-piece makes it possible to provide guiding in translation before the screwing-together, which is thus facilitated.

BRIEF DESCRIPTION OF THE DRAWINGS

Other characteristics, advantages, and details of the invention can be better understood on reading the following supplementary description of embodiments given by way of example and with reference to the drawings, in which:

FIG. 1 is a side view of a connection and transport pipe segment;

FIG. 2 is a side view of an outer wall segment without a narrower portion;

FIG. 12 is a longitudinal section view of junction between two double-walled pipe segments;

FIG. 13 diagrammatically shows a floor-to-surface link tube installed out in the open sea.

DETAILED DESCRIPTION OF PREFERRED EMBODIMENTS

Figure 14:
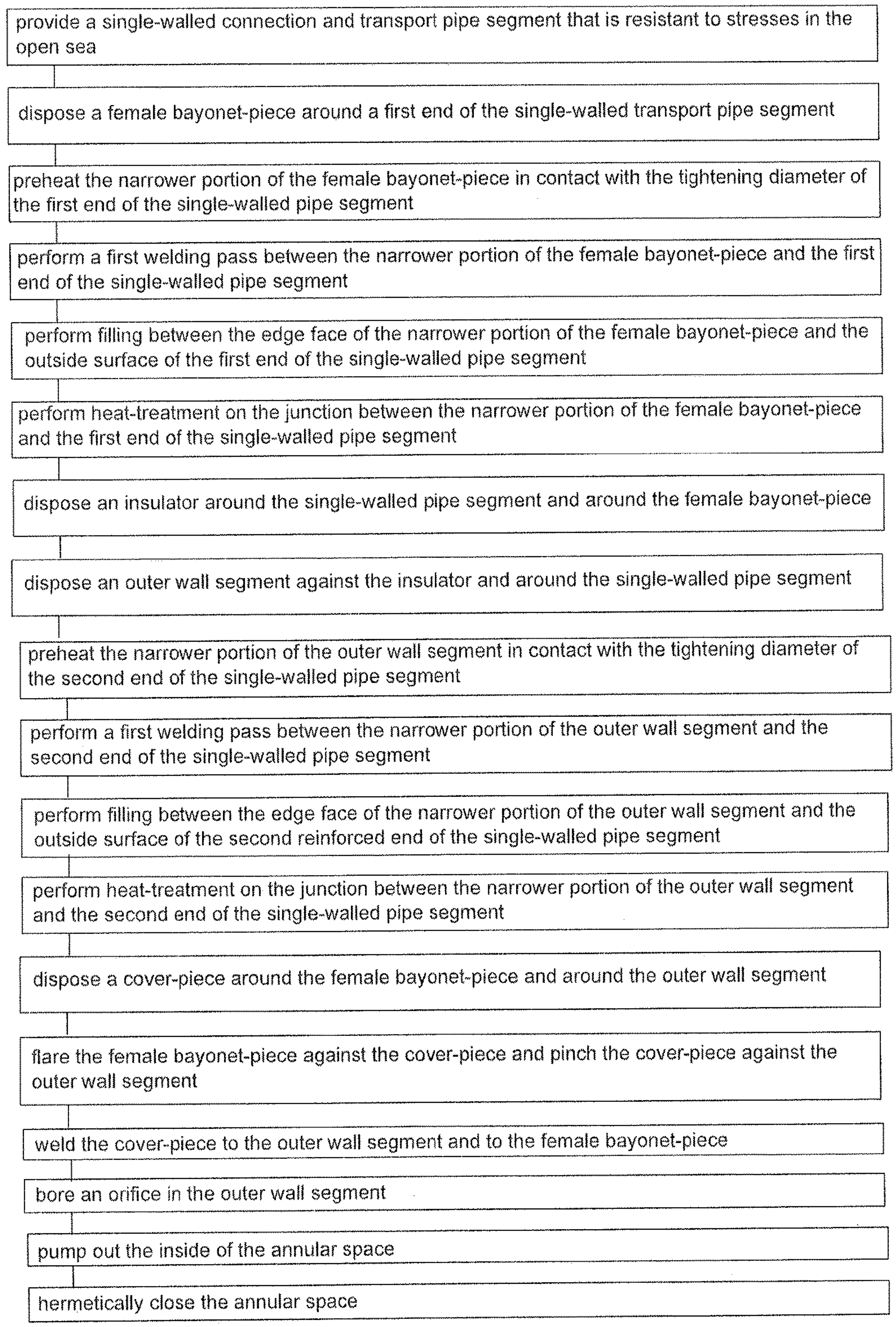
FIG. 14 shows an example of a method of manufacturing a double-walled pipe segment of the invention.

The invention is described in more detail below. An example of a method of manufacturing a double-walled pipe segment is shown in FIG. 14. The manufacturing steps and the elements used for the manufacturing are described in detail below with reference to FIGS. 1 to 11.

FIG. 1 is a side view of a connection and transport pipe segment 1. This pipe segment 1 comprises a central tube 15 in which the transport pipe 18 is formed that opens out at the two ends of the pipe segment 1. For example, the inside diameter D35 of the transport pipe 18 lies in the range 120 millimeters (mm) to 140 mm.

The central tube 15 is secured to two portions 6 and 7 forming the two reinforced ends 6 and 7 of the pipe segment 1. This securing is obtained by two friction welds 16 and 17. The reinforced ends 6 and 7 are also referred to as "tool joints".

For example, the central tube 15 is made of steel having high yield strength greater than or equal to 95 ksi, and preferably greater than or equal to 105 ksi. For example, the central tube has a thickness lying in the range 8 mm to 16 mm.

The central tube 15, which, for example, has an outside diameter of 168 mm, is joined, at each end, to a respective first wider portion of diameter D32, e.g. of 175 mm, itself extended by a respective wider portion of diameter D33, e.g. of 205 mm, which portion constitutes the tightening diameter D33. The thickness of the wall of the pipe segment 1 is thus reinforced at its ends. The reinforced ends 6 and 7 of the single-walled connection and transport pipe segment 1 are further made of a steel having very high yield strength that is greater than or equal to 100 ksi, and that is preferably greater than or equal to 120 ksi.

The male reinforced end 7 includes an end portion that is beveled and threaded on its outside surface 21. The female reinforced end 6 includes an inside surface 20 that is beveled and threaded. Two connection and transport pipe segments 1 can thus be joined end-to-end by screw-fastening.

For example, such a single-walled connection and transport pipe segment 1 may have a length L34 of about 12 m. In particular, this type of single-walled pipe segment 1 has mechanical characteristics making it resistant to the open sea.

FIG. 2 shows a side view of an outer wall segment 2 used for manufacturing the double-walled pipe segment. In particular, the outer wall segment 2 is of inside diameter D36 greater than the outside diameter D33 of the reinforced ends 6 and 7 of the connection and transport pipe segment 1. The outer wall segment, shown straight in FIG. 2, is pinched at one of its ends so as to come against the above-described connection and transport pipe segment 1, and more precisely against a tightening portion having a tightening diameter D33. The length L37 of the outer wall segment 2 is designed so that at one end it comes against the tightening portion of one of the reinforced ends and at the other end it comes close to the weld junction 17 of the other reinforced end.

For example, the outer wall segment 2 may have a thickness lying in the range 8 mm to 15 mm. For example, the material used for the outer wall segment 2 is steel having high yield strength greater than or equal to 65 ksi. The yield strength of the outer wall segment 2 is preferably at least 80 ksi. Its strength is such that it can withstand, in particular, lateral forces and pressures in marine environments, at depths lying in the range 500 m to 3,000 m.

Figure 3:
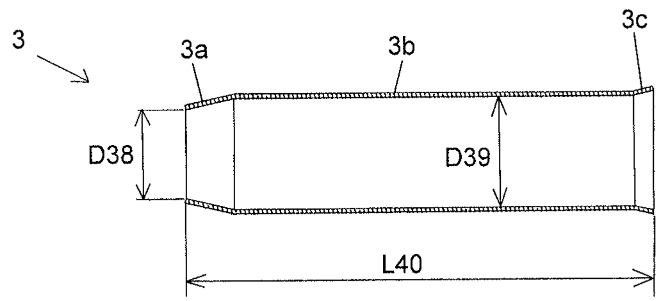
FIG. 3 is a longitudinal section view of a bayonet-piece.

FIG. 3 is a longitudinal section view of a female bayonet-piece 3. The female bayonet-piece comprises a cylindrical elongate middle portion 3*b* extended at either end respectively by a narrower portion 3*a* and by a wider portion 3*c*. The wider portion 3*c* may be formed by flaring before the bayonet-piece is mounted or while it is being fastened.

The narrower portion 3*a* may be formed by pinching before the bayonet-piece is mounted or while it is being fastened. The narrower portion 3*a* has an inside diameter D38 corresponding to the tightening diameter D33 of the reinforced ends of the connection and transport pipe segment 1 while taking into account working clearance for a weld.

The inside diameter D39 of the cylindrical portion 3*b* of the female bayonet-piece is greater than the outside diameter of the outer wall segment 2. Working clearance thus enables the bayonet-piece to overlap the outer wall segment 2 of an adjacent double-walled pipe segment as described below in relation with FIG. 12. For example, the length L40 of the female bayonet-piece 3 may lie in the range 800 mm to 1,400 mm. This length L40 is designed so that the bayonet-piece comes in front of the reinforced end to which it is fastened in such a manner as to cover the reinforced end of the adjacent double-walled pipe segment and as to overlap the outer wall segment of the adjacent double-walled pipe segment as shown in FIG. 12.

For example, the bayonet-piece 3 may have a thickness lying in the range 6 mm to 12 mm. The female bayonet-piece 3 is made of high yield strength steel having an elastic limit of at least 65 ksi, and preferably of at least 80 ksi.

The female bayonet-piece 3 is disposed around the reinforced end 6 with its narrower portion 3*a* coming against the portion having a tightening diameter. For example, this tightening portion is chosen to be as far away as possible from the thread 20 and as close as possible to the intermediate-diameter portion of said reinforced end 6.

For the welding between the female bayonet-portion 2 and the tightening portion of the reinforced end 6, the narrower portion 3*a* of the female bayonet-piece and the reinforced end 6 are preheated. The preheating temperature lies in the range 200° C. to 300° C.

Figure 4:
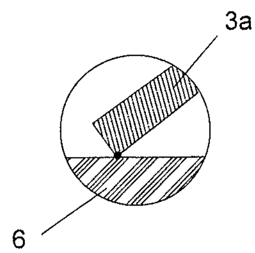
FIGS. 4 to 6 show details of the fastening of the bayonet-piece to the end of the connection and transport pipe segment.

During a following step, a first welding pass is performed between the narrower portion 3*a* of the female bayonet-piece 3 and the reinforced end 6, as shown in FIG. 4. That welding is, for example, lap welding.

Figure 5:
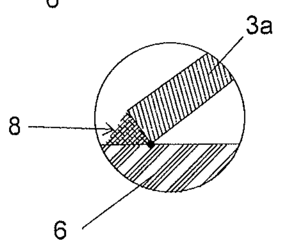

During a following step, as shown in FIG. 5, filling by welding 3 is performed between the edge face of the narrower portion 3*a* of the female bayonet-piece 3 and the outside surface of reinforced end 6.

Figure 6:
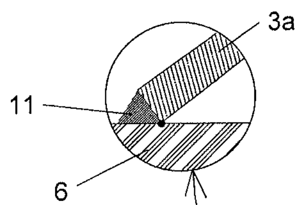

A heat-treatment step is then performed for heat-treating the junction between the narrower portion 3*a* of the female bayonet-piece and the reinforced end 6. This heat-treatment is performed at a temperature lying in the range 500° C. to 700° C. The resulting weld 11 between the reinforced end 6 and the bayonet-piece 3*a* is shown in FIG. 6.

Figure 7:
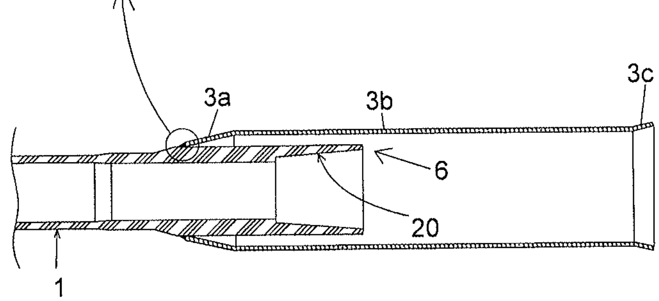
FIG. 7 is a longitudinal view of an end of the connection and transport pipe segment equipped with the bayonet-piece.

FIG. 7 is a longitudinal section view of an end of the connection and transport pipe segment 1 equipped with the female bayonet-piece. The bayonet-piece then has its narrower portion 3*a* fastened to the reinforced end 6 of the connection and transport pipe segment 1, while its free end portion 3*c* is disposed ahead from the end 6 of the pipe segment 1.

As shown in FIG. 7, the free end portion 3*c* is already wider when the bayonet-piece is fastened. This wider portion 3*c* corresponds to the maximum diameter of the bayonet-piece 3.

In a variant, the free end portion of the female bayonet-piece may also be straight and then be subsequently made wider by flaring.

As shown in FIG. 7, each female bayonet-piece is associated with the female reinforced end 6 of each single-walled pipe segment 1.

In a variant, it is possible to make provision to fasten each female bayonet-piece to the male reinforced end of each single-walled pipe segment.

Figure 8:
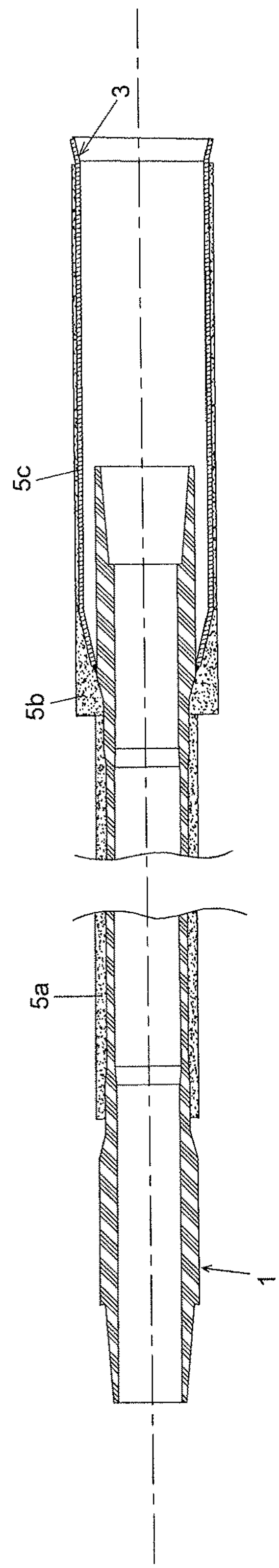
FIG. 8 is a longitudinal section view of the connection and transport pipe segment equipped with the bayonet-piece and with the insulating material.

After the bayonet-piece has been fastened, an insulator 5*a*, 5*b*, and 5*c* is disposed around the connection and transport segment 1 and around the female bayonet-piece 3, as shown in FIG. 8.

For example, the thermally insulating material is a solid material, such as a microporous material. The open-pore material is, for example, based on fumed silica. Advantageously, such a material put under a reduced pressure makes it possible to provide thermal insulation that is particularly effective. The thermally insulating material is then disposed in a closed and sealed dry space situated around the connection and transport pipe segment 1.

Figure 9:
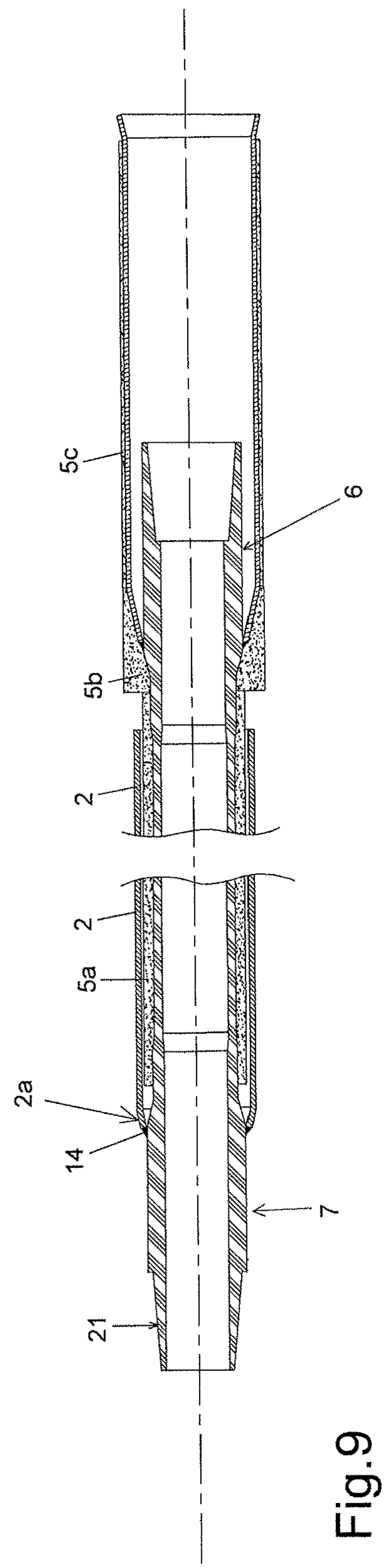
FIG. 9 is a longitudinal section view of the connection and transport pipe segment equipped with the bayonet-piece, with the insulating material, and with the outer wall segment.

During a following step, the outer wall segment 2 is disposed around the insulator 5*a* and around the connection and transport pipe segment 1, as shown in FIG. 9. Assembly clearance is provided between the outside diameter of the thermally insulating material and the inside diameter of the outer wall segment 2.

The outer wall segment 2 has a narrower portion 2*a* at one of its ends that is disposed against a tightening portion of a reinforced end 7 of the connection and transport pipe segment. This narrower portion 2*a* may be formed by pinching before the outer wall segment 2 is mounted or while it is being fastened. The inside diameter of the narrower portion 2*a* corresponds to the outside diameter of the outer wall segment 2, working clearance being provided for welding.

The other end of the outer wall segment 2 is disposed at the opposite reinforced end 6 at which the female bayonet-piece 3 is fastened and behind the wider portion having the tightening diameter.

The narrower portion 2*a* of the outer wall segment 2 is then welded to the tightening portion of the reinforced end 7 of the transport pipe segment. In this example, the outer wall segment is fastened to the male end 7 of the connection and transport pipe segment.

As shown in FIG. 9, the weld 14 is formed over a portion having a tightening diameter and situated as far away as possible from the threaded portion 21 of said reinforced end 7. The weld 14 between the outer wall segment 2 and the reinforced end 7 of the connection and transport segment 1 may advantageously be formed in the same way as the weld 11 between the female bayonet piece and the opposite reinforced end.

Thus, the second reinforced end 7 and the narrower portion 2*a* of the outer wall segment in contact with the second reinforced end 7 are preheated to a first temperature lying in the range 200° C. to 300° C.; and then

- a first welding pass is performed between the narrower portion 2*a* of the outer wall segment 2 and the second reinforced end 7, forming, for example, a lap weld;
- filling by welding is performed between the edge face of the narrower portion 2*a* of the outer wall segment 2 and the outside surface of the second reinforced end 7; and
- the junction between the narrower portion 2*a* of the outer wall segment 2 and the second reinforced end 7 is heat-treated, at a second temperature lying in the range 500° C. to 700° C.

Figure 10:
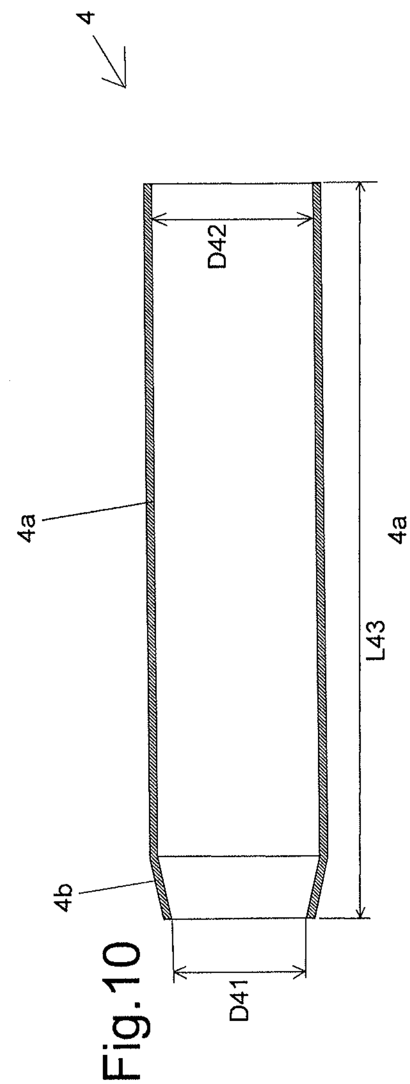
FIG. 10 is a longitudinal section view of a cover-piece.

FIG. 10 is a longitudinal section view of a cover-piece 4 designed to cover the female bayonet-piece 3 and to overlap the outer wall segment 2. The cover-piece 4 includes a cylindrical portion 4*a* extended by a narrower portion 4*b* of inside diameter D41 corresponding to the outside diameter of the outer wall segment 2, while taking into account working clearance for welding. The narrower portion 4*b* may be formed by pinching before the cover-piece is mounted or while it is being fastened.

The inside diameter D42 of the cylindrical portion 4*a* corresponds to the outside diameter of the wider portion 3*c* of the female bayonet-piece 3, while taking into account working clearance for welding.

The cover-piece 4 is of length L43 enabling it to extend from the wider end 3*c* of the female bayonet-piece to the outer wall segment 2. The cover-piece 4 thus fully covers the female bayonet-piece 3 and partially covers, i.e. overlaps, the outer wall segment 2. For example, the cover-piece 4 may have a length lying in the range 1,100 mm to 1,700 mm. For example, the thickness of the cover-piece 4 may lie in the range 10 mm to 22 mm.

The cover-piece is made of a steel that has yield strength greater than or equal to 65 ksi, and preferably at least 80 ksi. For example, the cover-piece 4 is made of the same high yield strength steel as the female bayonet-piece 3.

After disposing the cover-piece 4 around the female bayonet-piece 3 and around the outer wall segment 2, the cylindrical portion 4*a* of the cover-piece is welded to the wider portion 3*c* of the female bayonet-piece 3. The weld 12 is, for example, a lap weld. The free end of the female bayonet-piece is optionally flared against the cover-piece 4 before the welding.

In addition, the narrower portion 4*b* of the cover-piece 4 is welded to the outer wall segment 2, e.g. via a lap weld 13. The narrower portion 4*b* may be formed by pinching before the cover-piece is mounted or while it is being fastened.

Figure 11:
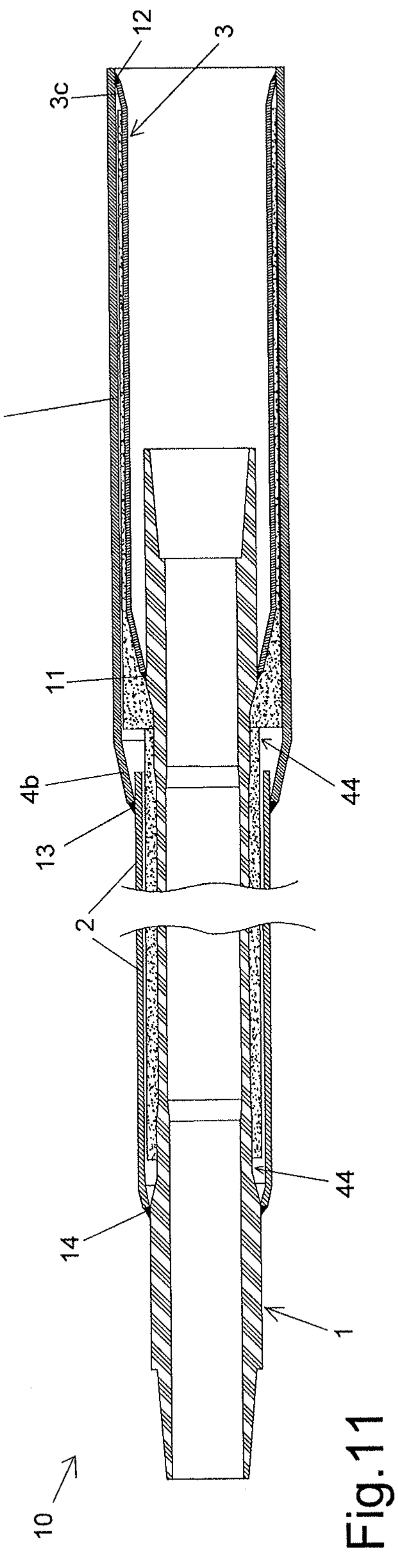
FIG. 11 is a longitudinal section view of a double-walled pipe segment.

As shown in FIG. 11, the space 44 around the pipe segment 1 and around the female bayonet-piece 3 is thus closed in sealed manner. The thermally insulating material disposed in said annular space may, in particular, be put under a low pressure.

It is possible to provide a step of putting the space extending in particular between the outer wall segment 2 and the transport segment 1 at a low pressure. Putting that space at a low pressure is, for example, performed by boring an orifice in the outer wall segment 2 and then by pumping out the inside of the annular space 44, and then finally by hermetically closing the annular space 44. Advantageously, such a double-walled pipe segment 10 that is put at a low pressure keeps its thermal insulation properties throughout its life. For example, the pressure is set to be lower than 1 bar or than a few millibars.

The welds 11, 12, 13, and 14 are performed in such a manner as to make it possible to transmit determined tightening torque applied to the outer wall segment 2 for joining by screwing together two single-walled pipe segments 1*a* and 1*b* of two adjacent double-walled pipe segments 10*a* and 10*b*. Such a junction is shown in FIG. 12. For example, the tightening torque may lie in the range 50,000 newton meters (N·m) to 65,000 N·m.

The tightening torque is applied by clamping a first jaw onto the outer wall segment of a first pipe segment 10*a* and by clamping a second jaw onto the outer wall segment of a second pipe segment 10*b*, the first and second jaws being mounted to move in rotation relative to each other.

The tightening torque is transmitted via the cover-piece and via the female bayonet-piece. In particular the female bayonet-piece has an S-shaped profile. For example, the maximum diameter of the female bayonet-piece lies in the range 130% of the tightening diameter of a reinforced end of the single-walled connection and transport pipe segment to 170% of said tightening diameter.

As indicated above, the inside diameter of the cylindrical portion 3*b* of the female bayonet-piece is greater than the outside diameter of the outer wall segment, the female bayonet-piece coming in front of the reinforced end to which it is fastened and in such a manner as to cover the reinforced end and as to overlap the outer wall segment of the adjacent double-walled pipe segment 10*b*.

The end-to-end assembly of the double-walled pipe segments 10*a* and 10*b* makes it possible to put in place rapidly a floor-to-surface link tube 23 having good thermal insulation, as shown diagrammatically in FIG. 13. The coefficient of thermal transmittance U of a double-walled pipe segment of the invention may reach 3 watts per square meter Kelvin ($W/m^2 \cdot K$) and even 0.5 $W/m^2 \cdot K$. The floor-to-surface link tube 23 may thus have the same coefficient of thermal transmittance U.

FIG. 13 shows a petroleum drilling rig 22 floating on the surface of the water 30. Such drilling rig is known as RIG. The floor-to-surface link tube 23 goes down from the drilling rig 22 to the sea floor 31.

It is possible to make provision for attaching the floor-to-surface link tube 23 to equipment 24 such as a bell capping a subsea well, in particular in situations of accidental hydrocarbon leaks.

The double-walled pipe segments of the invention can thus withstand internal pressure of up to 1,000 bars, e.g. by means of reinforced threaded connection ends, each having two shoulders.

The double-walled pipe segments also have a long lifespan, in particular due to their resistance to mechanical fatigue and, by means of their capacity to withstand multiple assemblies and disassemblies. For example, a double-walled pipe segment can withstand at least 100 assemblies and disassembles without significant degradation or damage.

It should be clear to the person skilled in the art that other variant embodiments of the present invention are possible. Therefore, these embodiments should be considered merely as illustrations of the invention.

What is claimed is:

1. A method of manufacturing a double-walled pipe segment comprising:

- providing a connection and transport pipe segment that is provided with first and second threaded reinforced ends;
- disposing a female piece around said first reinforced end, the female piece including a wider portion, a cylindrical portion and a narrower portion, wherein the cylindrical portion is between the wider portion and the narrower portion, the wider portion is wider than the cylindrical portion, the cylindrical portion is wider than the narrower portion and the narrower portion comes against a tightening portion of the first reinforced end;
- welding or bonding the narrower portion of the female piece to said tightening portion of said first reinforced end;
- disposing a thermal insulator around the connection and transport pipe segment and around the female piece;
- inserting said connection and transport pipe segment equipped with said thermal insulator into an outer wall segment;
- welding or bonding a narrower portion of the outer wall segment to said second reinforced end;
- disposing a cover-piece around the female piece, the cover-piece having a cylindrical portion in contact at one end with the wider portion of the female piece and being extended at the other end via a narrower portion coming against the outer wall segment, wherein the cylindrical portion of the cover-piece is wider than the narrower portion of the cover-piece; and
- welding or bonding the narrower portion of the cover-piece to the outer wall segment and the cylindrical portion of the cover-piece to the female piece.

2. The method of manufacturing according to claim 1, wherein said welds or bonds are formed in such a manner as to enable a determined tightening torque to be transmitted to said first and second reinforced ends so as to form a junction by screw-fastening between two connection and transport pipe segments of two adjacent double-walled pipe segments.

3. The method of manufacturing according to claim 1, wherein said first and second reinforced ends of said connection and transport pipe segment are made of a first steel having a yield strength of at least 100 kilopounds per square inch (ksi) and said cover-piece and said female piece is made of a same second steel having a high yield strength of at least 65 ksi.

4. The method of manufacturing according to claim 3, wherein said cover-piece and said female piece are welded together by a lap weld, while, for the weld or bond between said female piece and the tightening portion of said first reinforced end, the method comprising:

- preheating said first reinforced end and the narrower portion of said female piece in contact with said first reinforced end, to a first temperature lying in the range 200° C. to 300° C.;
- performing a first welding pass between said narrower portion of said female piece and said first reinforced end;
- performing filling by welding between the edge face of said narrower portion of said female piece and the outside surface of said first reinforced end;
- heat-treating the junction between said narrower portion of said female piece and said first reinforced end, at a second temperature lying in the range 500° C. to 700° C.

5. The method of manufacturing according to claim 3, wherein said outer wall segment is made of said second steel.

6. The method of manufacturing according to claim 1, wherein said cover-piece and said outer wall segment are welded together by a lap weld, while, for the weld or bond between said outer wall segment and the tightening portion of said second reinforced end, the method comprising:

- preheating said second reinforced end and a narrower portion of said outer wall segment in contact with said second reinforced end, to a first temperature lying in the range 200° C. to 300° C.;
- performing a first welding pass between said narrower portion of said outer wall segment and said second reinforced end;
- performing filling by welding between the edge face of said narrower portion of said outer wall segment and the outside surface of said second reinforced end;
- heat-treating the junction between said narrower portion of said outer wall segment and said second reinforced end, at a second temperature lying in the range 500° C. to 700° C.

7. The method of manufacturing according to claim 1, wherein said thermal insulator is a solid material of the microporous type, the manufacturing method further comprising a step of putting the space disposed between said outer wall segment and said connection and transport pipe segment at a reduced pressure.

8. The method of manufacturing according to claim 7, wherein the open-pore of said thermal insulator is based on fumed silica.

9. The method of manufacturing according to claim 1, wherein said female piece has a maximum diameter lying in the range 130% of the tightening portion of said first reinforced end to 170% of said tightening portion.

10. The method of manufacturing according to claim 1, wherein the wider portion of said female piece is obtained by flaring the female piece out against said cover-piece from a straight end portion of said female piece.

11. The method of manufacturing according to claim 1, wherein an inside diameter of the cylindrical portion of said female piece is greater than an outside diameter of said outer wall segment, said female piece coming in front of said first reinforced end and in such a manner as to overlap the outer wall segment of an said adjacent double-walled pipe segment.

12. The method of manufacturing according to claim 11, wherein said first and second reinforced ends correspond respectively to said female and male reinforced ends of said connection and transport pipe segment.

* * * * *